United States Patent [19]

Miyamoto et al.

[11] Patent Number: 5,774,234
[45] Date of Patent: Jun. 30, 1998

[54] IMAGE DATA PROCESSING APPARATUS

[75] Inventors: Ryosuke Miyamoto, Urayasu; Hiroyuki Ichikawa, Kawasaki; Hideaki Shimizu, Yokohama, all of Japan

[73] Assignee: Canon Kabushiki Kaisha, Tokyo, Japan

[21] Appl. No.: 657,044

[22] Filed: May 29, 1996

[30] Foreign Application Priority Data

May 30, 1995 [JP] Japan .................................. 7-131819

[51] Int. Cl.$^6$ .............................. H04N 1/393; H04N 1/40
[52] U.S. Cl. ......................... 358/451; 358/444; 395/116
[58] Field of Search .................... 358/451, 444, 358/448, 443, 525, 528, 530; 382/300, 299, 298, 303, 304; 395/115, 112, 116

[56] References Cited

U.S. PATENT DOCUMENTS

| 4,885,786 | 12/1989 | Anderson et al. | 382/235 |
| 5,060,059 | 10/1991 | Mori et al. | 358/518 |
| 5,189,529 | 2/1993 | Ishiwata et al. | 358/451 |
| 5,280,546 | 1/1994 | Machida et al. | 358/451 |
| 5,465,166 | 11/1995 | Kamo | 358/451 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

An image processing apparatus having parallel line conversion circuits for inputting, in parallel, image data for plural lines, line selection circuits for selecting plural sets of image data consisting of image data for at least one line from supplied image data for the plural lines, and sub-scanning interpolation circuits for interpolating each of the selected plural sets of image data.

18 Claims, 14 Drawing Sheets

5,774,234

IMAGE DATA PROCESSING APPARATUS

BACKGROUND OF THE INVENTION

1. Field of the Invention

The present invention relates to an image data processing apparatus for use in a digital copying machine or a facsimile apparatus.

2. Related Background Art

Recently, digital copying machines having speeds in a range from 15 CPM (Copy Per Minute) to 30 CPM are widely used, the digital copying machine being arranged to perform a copying operation in such a manner that it forms images on recording sheets from image data obtained by reading the image of an original document by a line sensor, such as a CCD.

Although digitization of high speed machines is desired, the limitation on the data processing speed results in a necessity of reducing the quantity of data. Thus, compromises have been required in improving the resolution, gradient and copying speed. Thus, an applicant of the present invention has disclosed a parallel processing system (U.S. Ser. No. 502,763). Such a system is arranged to simultaneously process a plurality of lines to digitize a high-speed copying machine without the necessity of reducing the quantity of data.

In a case where image data for adjacent two lines in the sub-scanning direction is interpolated as a parallel process of the foregoing type, a complicated control system is required such that image data for two lines, to be interpolated, are extracted from image data for a plurality of parallel lines at a timing suitable to the interpolation operation.

SUMMARY OF THE INVENTION

Accordingly, an object of the present invention is to efficiently and quickly parallel-process each image data for plural lines.

Another object of the present invention is to subject supplied image data to a high speed magnification changing process or an interpolation process.

According to one aspect of the present invention, there is provided an image data processing apparatus including, input means for, in parallel, inputting image data for a plurality of lines, selection means for selecting a plurality of sets of image data consisting of image data for at least one line from image data for the plural lines supplied by the input means, and processing means for image-processing each of the plural sets of image data selected by the selection means.

According to another aspect of the present invention, there is provided an image data processing method including the steps of, inputting image data for plural lines in parallel, selecting plural sets of image data consisting of image data for at least one line from image data for the plural lines supplied in the input step, and processing each of the plural sets of image data selected in the selection step.

Other objects, features and advantages of the invention will be evident from the following detailed description of the preferred embodiments described in conjunction with the attached drawings.

DESCRIPTION OF THE PREFERRED EMBODIMENTS

Figure 2:
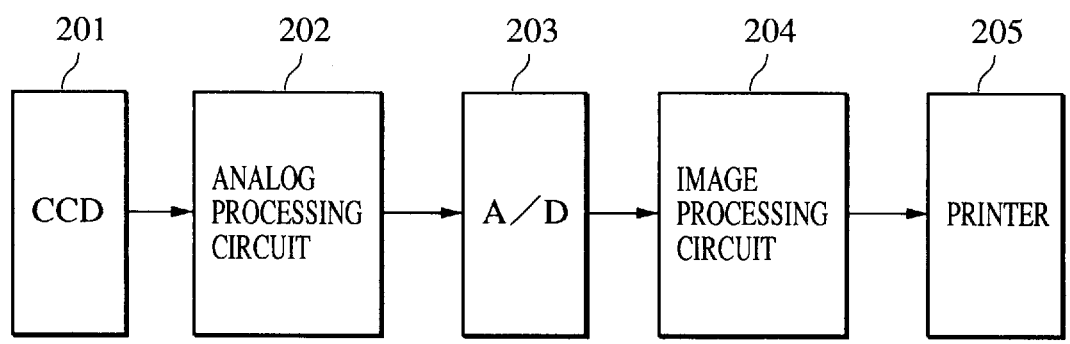
FIG. 2 is a block diagram of a digital copying machine to which the present invention is applied.

FIG. 2 is a block diagram showing a digital copying machine according to the present invention. Image data, obtained by reading the image of an original document by a CCD line sensor 201, is processed by an analog processing circuit 202, including a sample and hold circuit, followed by being converted into 8-bit digital data by an A/D converter 203. In an image processing circuit 204, image processes, such as shading correction, line parallel conversion, enlargement, reduction and Image Overlay, are performed. Processed image data is transmitted to a printer 205 so that the image is recorded on a recording sheet.

Figure 1:
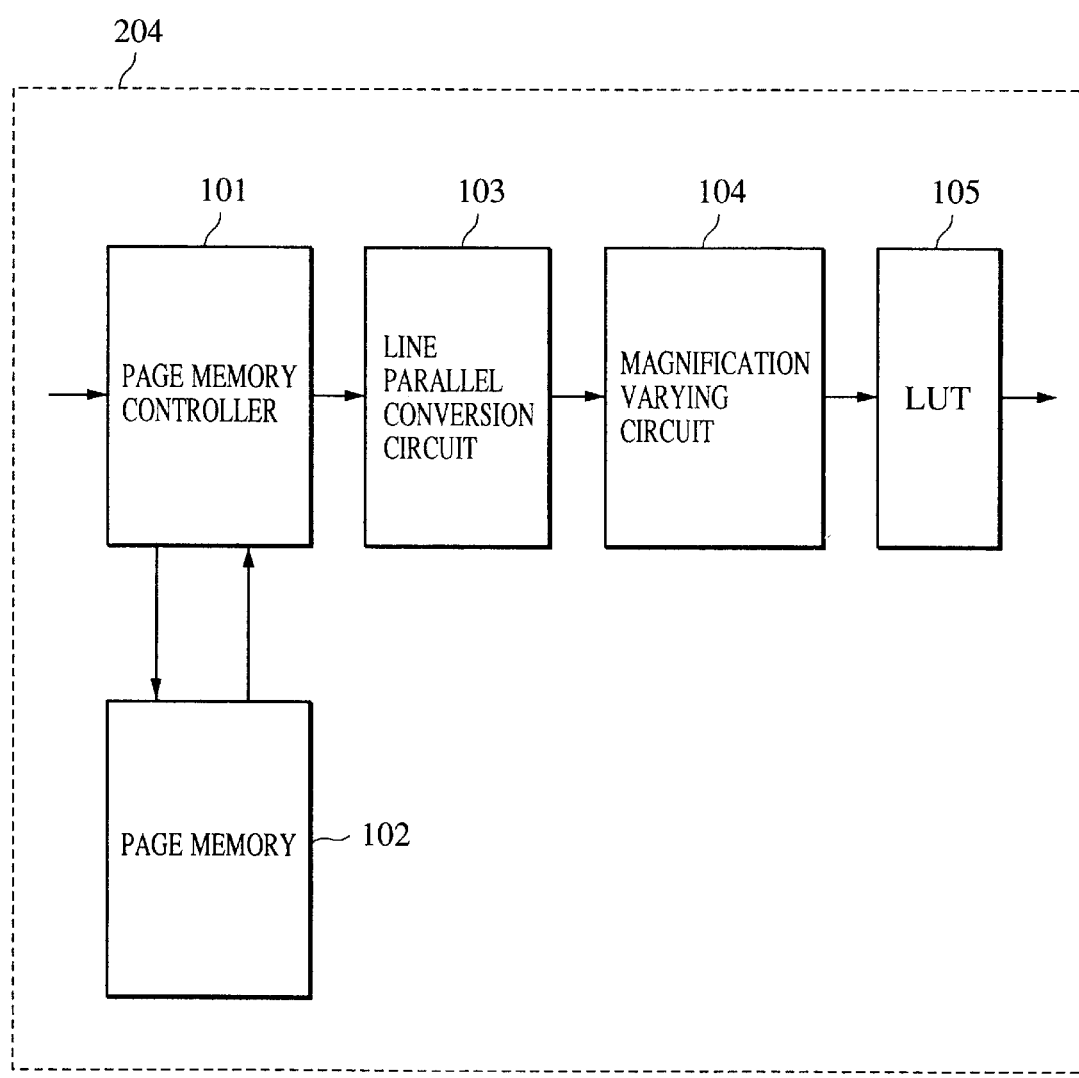
FIG. 1 is a block diagram of the image processing circuit 204 of FIG. 2.

FIG. 1 is a block diagram of the image processing circuit 204 of FIG. 2.

Digital image data transmitted from the A/D converter 203 is supplied to a page memory 102 through a page memory controller 101. By using the page memory 102, superimposing on other image data, an editing process and the like are performed, if necessary. Image data is supplied to the parallel line conversion circuit 103 from the page memory controller 101 so as to be converted into image data for four parallel lines.

Image data for four parallel lines is subjected to a process for changing the magnification in the magnification changing circuit 104 in accordance with a magnification changing instruction for enlargement or reduction. Then, the processed image data is, in a lookup table 105, converted into data to be printed, followed by being transmitted to a printer 205.

Figure 3:
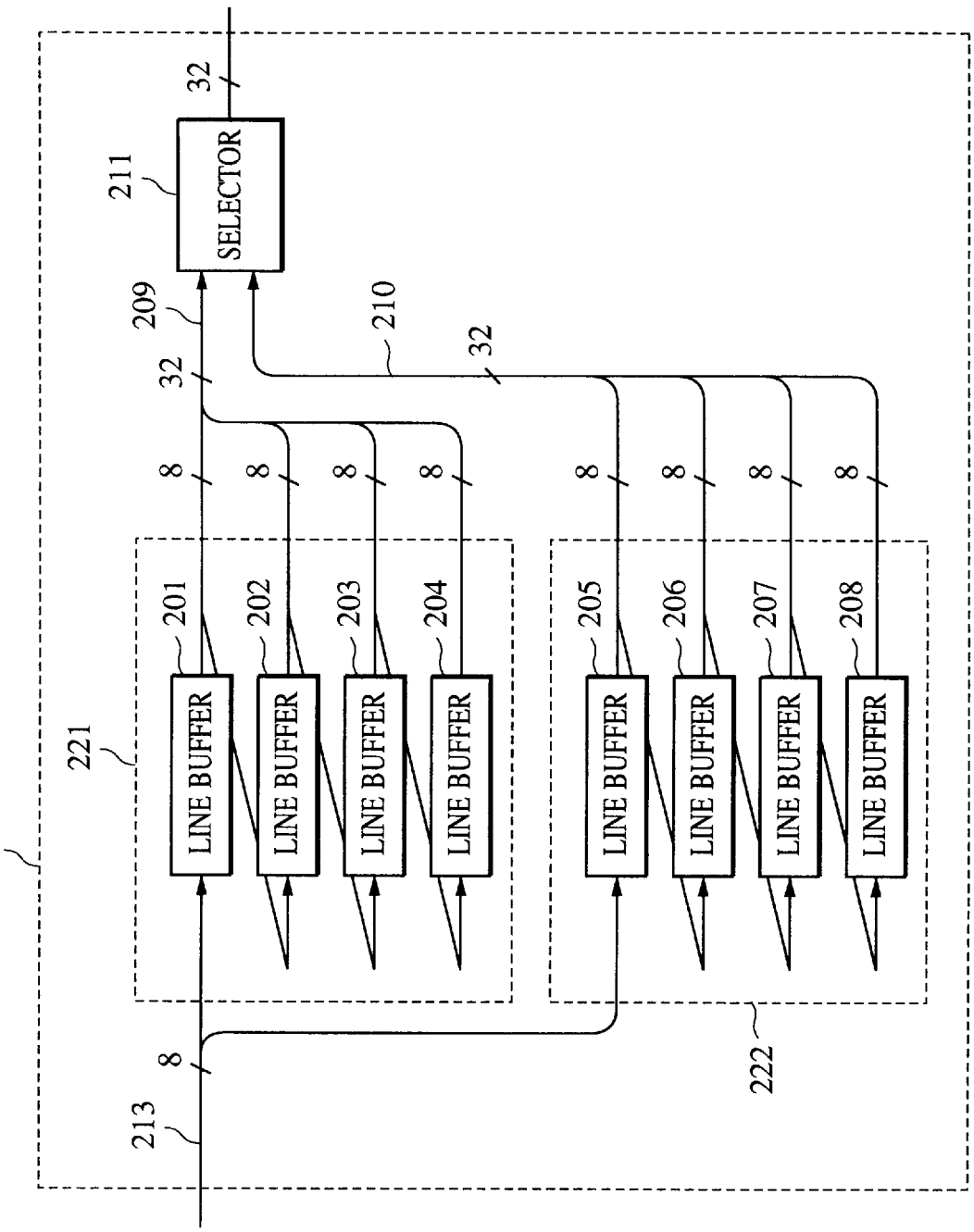
FIG. 3 is a block diagram of the parallel line conversion circuit 103 of FIG. 1.

FIG. 3 is a block diagram of the parallel line conversion circuit 103 of FIG. 1. Reference numerals 221 and 222 represent line buffer groups. Reference numeral 201 to 208 represent line buffers each of which is capable of storing image data for one line. Image data for four lines supplied, by a raster method, from the A/D converter 203 is supplied to line buffers 201, 202, 203 and 204 of the line buffer group 221, the line buffers 201, 202, 203 and 204 being serial-connected. Thus, continuous image data 209 for four lines is transmitted in parallel. Image data for four lines supplied from the A/D converter 203 during the parallel transmission of image data for four lines from the line buffer group 221 is supplied to line buffers 205, 206, 207 and 208 of the line buffer group 222, the line buffers 205, 206, 207 and 208 being serial-connected.

That is, a double buffer structure is formed in which one of the line buffer groups transmits image data during operation of another line buffer group to delay the input of image data.

Outputs 209 and 210 from the line buffer groups 221 and 222, respectively, are alternately selected by a selector 211 so that the selector 211 transmits image data for four parallel lines. As a result of the foregoing parallel line conversion operation, image data for four parallel line is transmitted at a speed about ¼ of the speed at which image data is supplied from the A/D converter 203.

Figure 4:
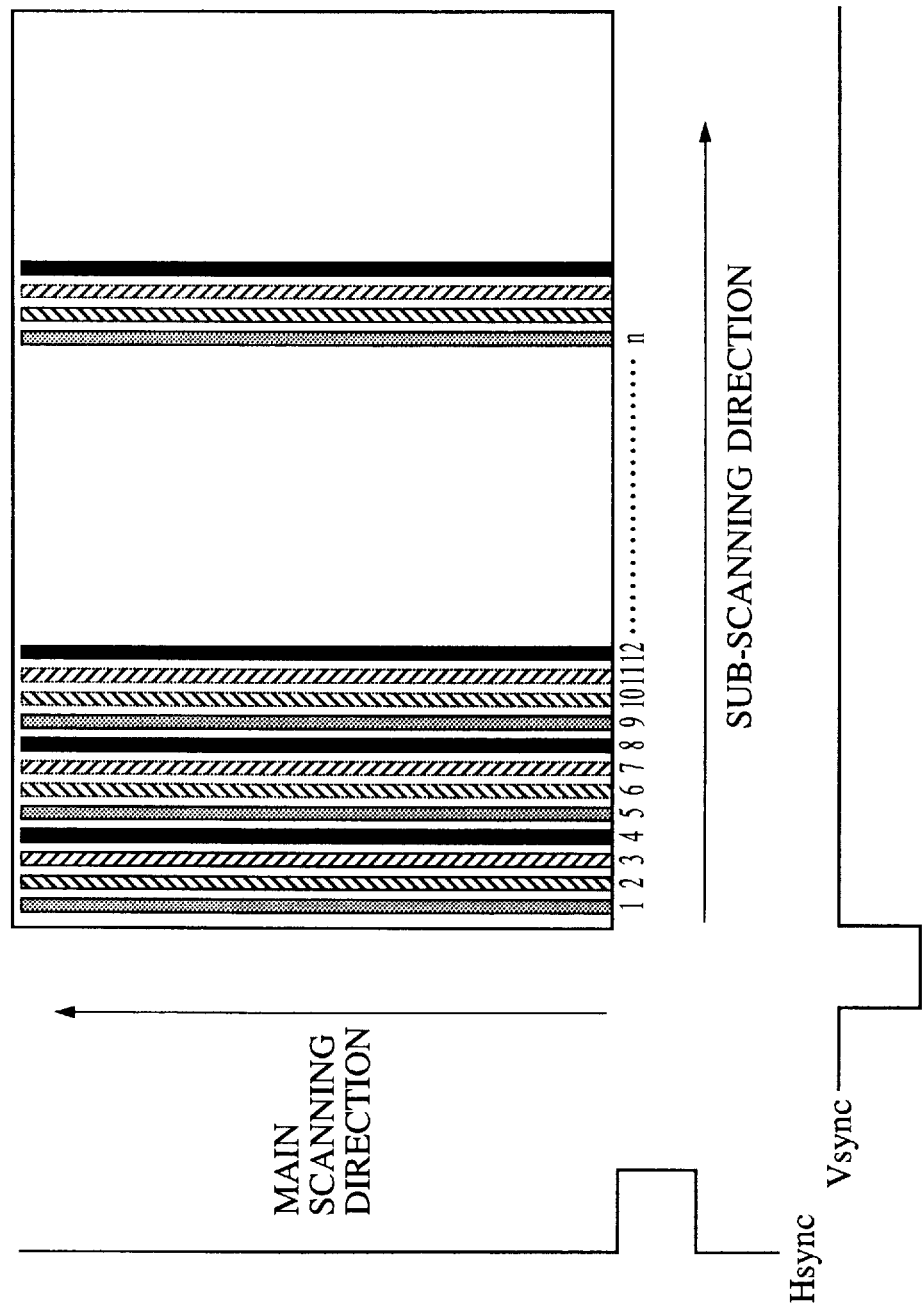
FIG. 4 is a diagram of a parallel line conversion operation.

Image data to be transmitted in the form of four parallel lines will now be described with reference to FIG. 4. Referring to FIG. 4, the arrows indicate the main and sub-scanning directions on the original document of the scanning operation to be performed by the CCD line sensor 201. The width in the main scanning direction is the width of the CCD line sensor 201. Lines 1 to n are arranged in the sub-scanning direction. In a first 1H (the interval of Hsync), image data items for lines 1, 2, 3 and 4 are simultaneously transmitted from the parallel line conversion circuit 103. In a next 1H, image data items for lines 5, 6, 7 and 8 are simultaneously transmitted from the parallel line conversion circuit 103. Some image data items are thereafter always processed in four line units.

Figure 5:
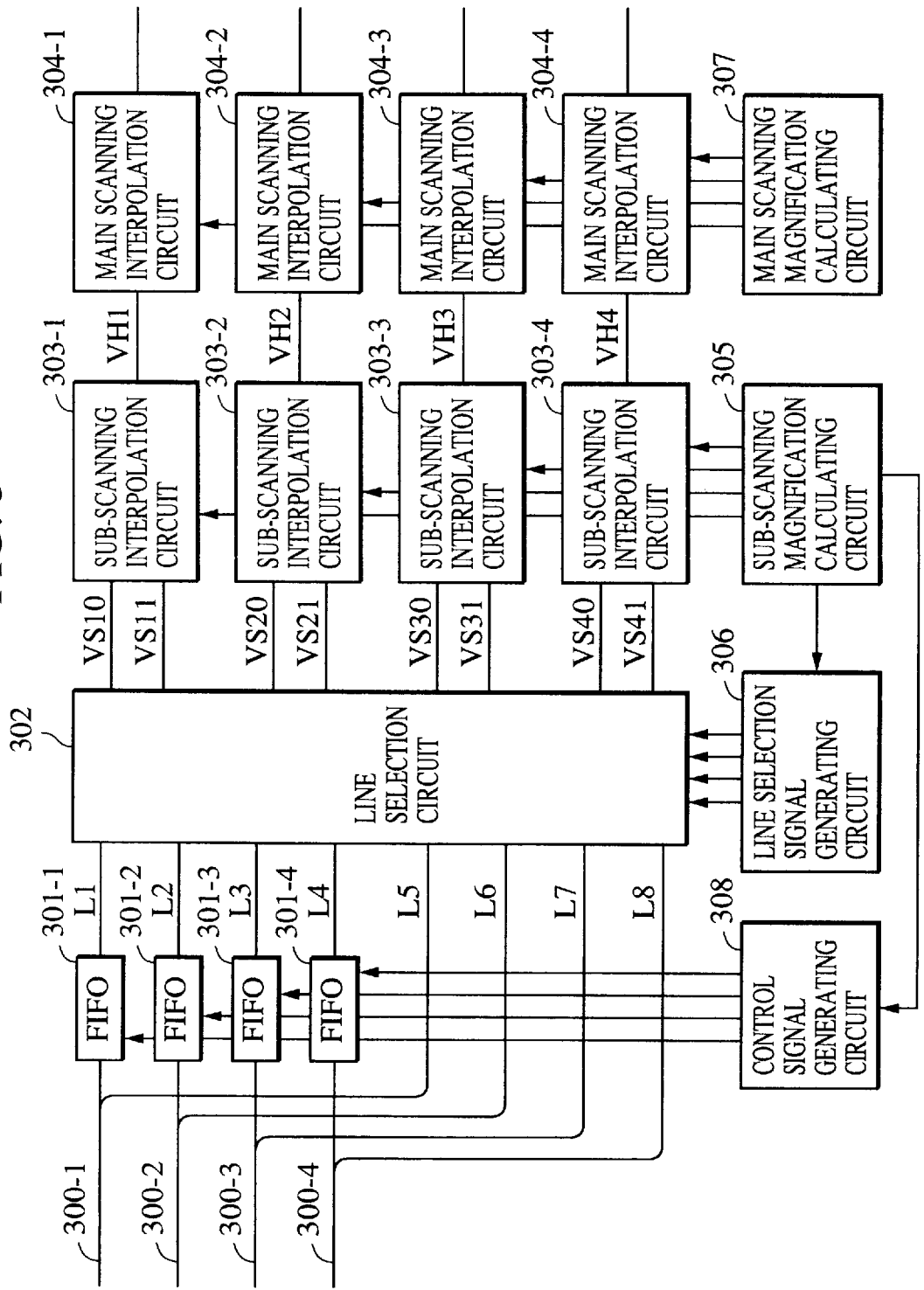
FIG. 5 is a block diagram of the magnification changing circuit 104 of FIG. 1.

FIG. 5 is a block diagram of the magnification changing circuit 104 (FIG. 1). The magnification changing circuit 104 subjects image data 300-1 to 300-4 for four parallel lines transmitted from the parallel line conversion circuit 103 to a four-line parallel process to enlarge or reduce the magnification in each of the sub-scanning direction and the main scanning direction.

Reference numeral 301 represents a FIFO (First In First Out Memory) for performing an operation to produce a delay of one line. As an image data bus, 8 lines are provided which consist of four lines (L1, L2, L3 and L4) which are connected to a line selection circuit 302 through four FIFOs 301 and four lines (L5, L6, L7 and L8) which are directly connected to the line selector circuit 302.

Figure 6:
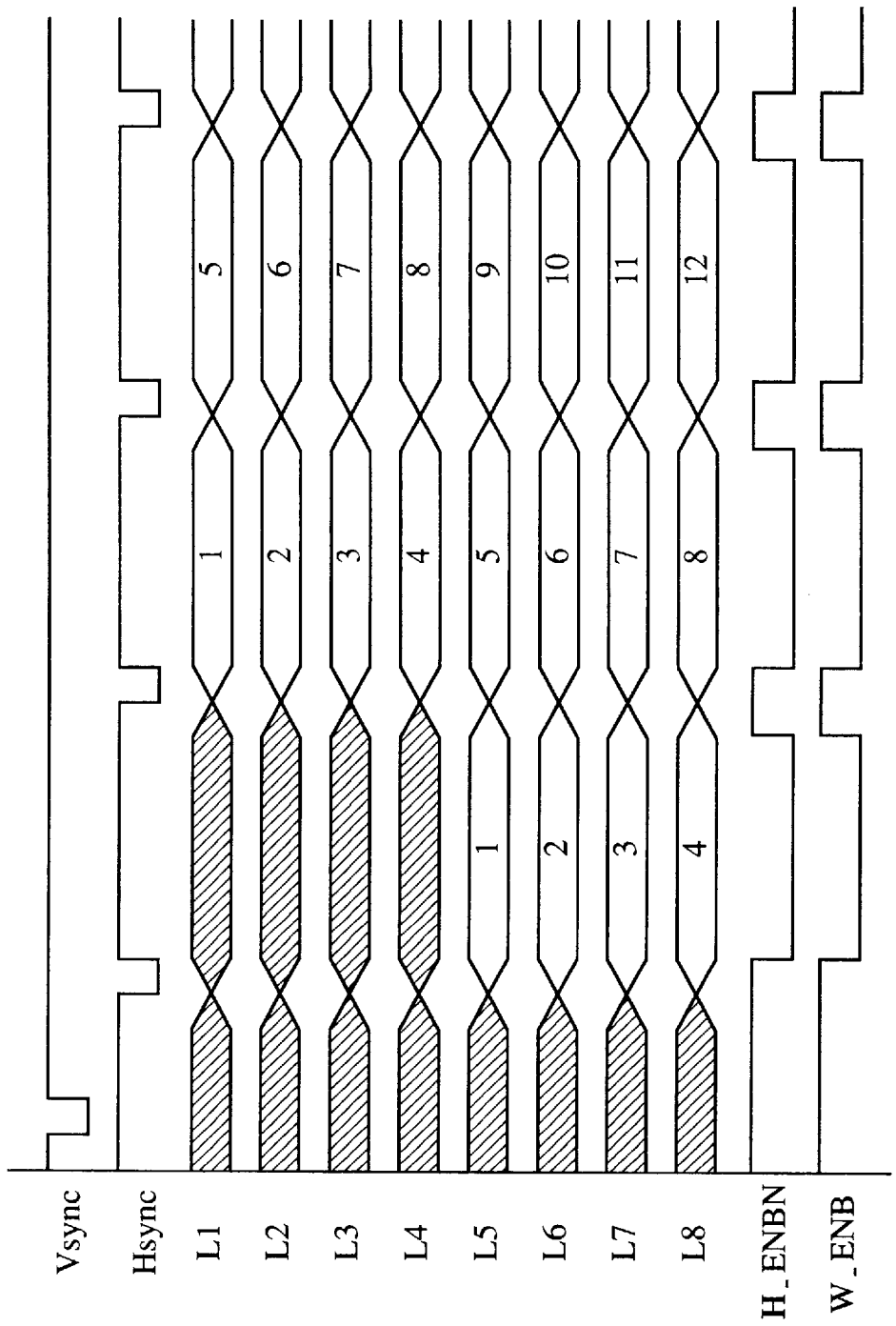
FIG. 6 is a timing diagram of an operation for inputting image data to the magnification changing circuit of FIG. 5.

Timing for transmitting image data to the line selection circuit 302 through the FIFO 301 is shown in FIG. 6.

Hsync is a synchronizing signal in the main scanning direction, while Vsync is a synchronizing signal in the sub-scanning direction. H_ENBN is a signal indicating that image data in the main scanning direction is active, while W_ENB is a signal permitting writing of image data to the FIFO 301 in the magnification changing circuit 104. If writing of image data to the FIFO 301 is always permitted (W_ENB=low) in a case where data is effective (H_ENBN=low) as shown in FIG. 6, image data, which has been supplied to the lines L5, L6, L7 and L8, is supplied to the lines L1, L2, L3 and L4 of the line selection circuit 302 while being delayed by one line. That is, image data for 8 lines continued in the sub-scanning direction is supplied to the line selection circuit 302.

The line selection circuit 302 selects two lines from the 8 lines continued in the sub-scanning direction. Image data for the two selected lines is supplied to a sub-scanning interpolation circuit 303 for performing a magnification changing process in the sub-scanning direction. Image data interpolated in the sub-scanning direction is supplied to a main scanning interpolation circuit 304 for performing a magnification changing process in the main scanning direction. The region from the line selection circuit 302 to the main scanning interpolation circuit 304 through the sub-scanning interpolation circuit 303 is in the form of a 4-channel structure. Note that reference numeral 305 represents a magnification calculating circuit in the sub-scanning direction, 306 represents line selection signal generating circuit, 307 represents a magnification calculating circuit in the main scanning direction and 308 represents a control signal generating circuit for generating a signal for controlling the FIFO 301.

If enlargement or reduction is not performed, the line selection circuit 302 performs a selection operation so that image data for four lines supplied to lines L5, L6, L7 and L8 is transmitted to VS10, VS20, VS30 and VS40. Both of the sub-scanning interpolation circuit 303 and the main scanning interpolation circuit 304 do not process the image data and transmit it unprocessed.

Figure 7:
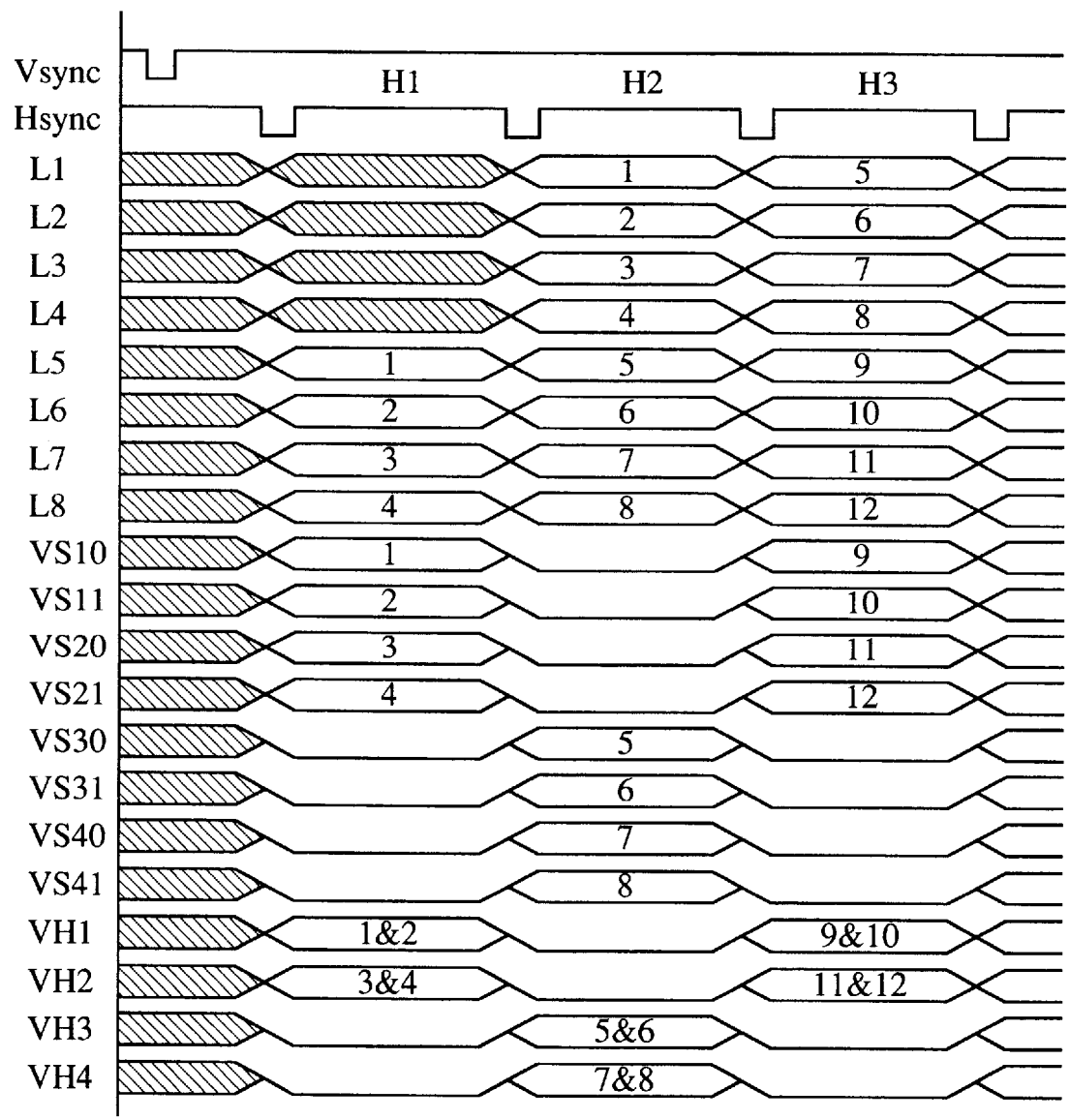
FIG. 7 is a timing diagram of an operation for changing the magnification in the magnification changing circuit of FIG. 5 by 50%.

The operation of the magnification changing circuit to be performed when enlargement or reduction is performed will now be described. FIG. 7 is a timing chart of the operation when reduction the magnification by a rate of 50% is performed. When reduction by 50% is performed, image data for two adjacent lines is interpolated to form image data for one line. Thus, the number of the lines in the sub-scanning direction is halved. Moreover, two adjacent pixels in the main scanning direction is interpolated so that the number of pixels per line is halved. Since no data has been written on the FIFO 301 in the first 1H (H1), effective image data is not supplied to L1, L2, L3 and L4 (all of the lines are low). On the other hand, image data for lines 1, 2, 3 and 4 are directly supplied to L5, L6, L7 and L8. As the output of the line selection circuit 302, image data for lines 1 and 2 respectively are transmitted to VS10 and VS11, and image data for lines 3 and 4 respectively are transmitted to VS 20 and VS 21. On the other hand, all of VS30, VS31, VS40 and VS41 are zero in the first period (H1).

The sub-scanning interpolation circuit 301-1 interpolates image data of the lines 1 and 2 supplies VS10 and VS11 in the sub-scanning direction. Thus, an interpolation output is transmitted to VH1. Similarly, the sub-scanning interpolation circuit 303-2 transmits the interpolation output of the lines 3 and 4 to VH2. Both of the sub-scanning interpolation outputs VH3 and VH4 of the sub-scanning interpolation circuits 303-3 and 303-4 are low because all of VS30, VS31, VS40 and VS41 are low.

In the next period (H2), image data of lines 1, 2, 3 and 4, which are direct inputs of the previous period, are delayed by the FIFO 301 followed by being transmitted. Thus, image data of the lines 5, 6, 7 and 8 is directly supplied to L5, L6, L7 and L8. At this time, all of VS10, VS11, VS20 and VS21 are low. The line selection circuit 302 selects image data of lines 5 and 6 for VS30 and VS31 and selects image data of lines 7 and 8 for VS40 and VS41.

In the period H2, both of the outputs VH1 and VH2 of the sub-scanning interpolation circuits 303-1 and 303-2 are zero. As for outputs VH3 and VH4 of the sub-scanning interpolation circuits 303-3 and 303-4, image data of lines 5 and 6 and lines 7 and 8 are transmitted after interpolation.

Interpolated image data which is outputs VH1, VH2, VH3 and VH4 of the four sub-scanning interpolation circuits 303, is interpolated in the main scanning direction by each of the main scanning interpolation circuit 304. Thus, image data is transmitted as data of lines 1, 2, 3 and 4 of an image, the size of which has been reduced.

The foregoing process is repeated so that image data for each four lines and reduced by 50% is generated in the period 2H. That is, image data reduced by 50% in the main scanning direction and the sub-scanning direction is formed.

The structure of the magnification changing circuit 104 shown in FIG. 5 will now be described in detail.

Figure 8:
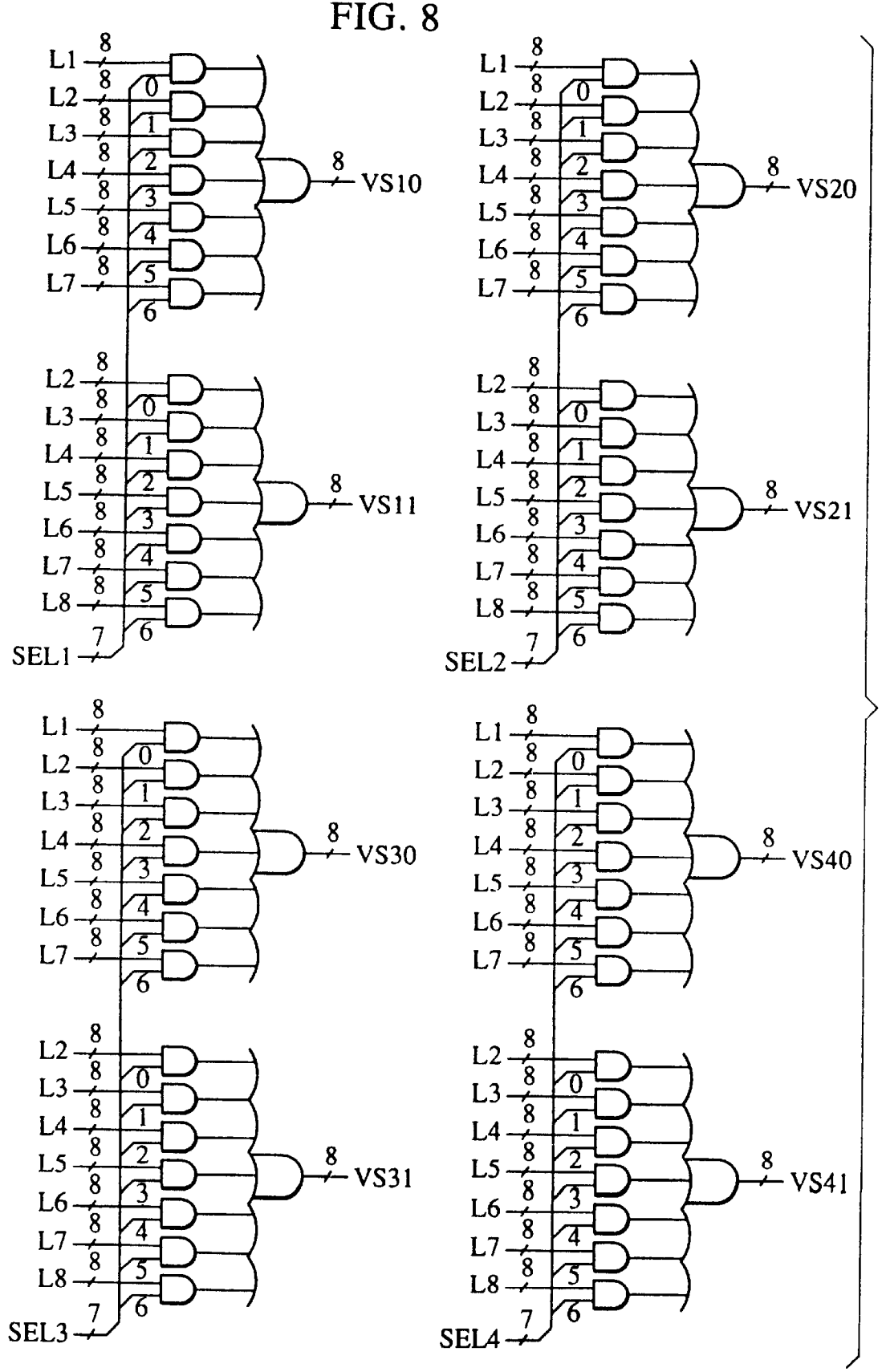
FIG. 8 is a block diagram of the line selection circuit 302 of FIG. 5.

FIG. 8 is a block diagram of the line selection circuit 302 shown in FIG. 5. Symbols L1 to L8 represent data bus lines for image data for 8 continuous lines, image data being supplied through the FIFO 301 or directly. Each of the bus lines L1 to L8 has a width of 8 bits. Symbols SEL1 to SEL4 represent selection signals which are supplied from the line selection signal generating circuit 306 and having a width of 7 bits. Selection signals SEL1 to SEL4 select one bus line in accordance with the logic shown in Tables 1 to 4, which follow, from the seven bus lines L1 to L7 and L2 to L8. Symbols VS10, VS11, VS20, VS21, VS30, VS31, VS40 and VS41 represent selected data bus outputs and have a width of 8 bits similar to the inputs. As a result of the foregoing structure, in response to each of selection signals SEL1 to SEL4, image data for two continuous lines is selectively transmitted to each of four sets, that is, VS10 and VS11, VS20 and VS21, VS30 and VS31 and VS40 and VS41.

Figure 9:
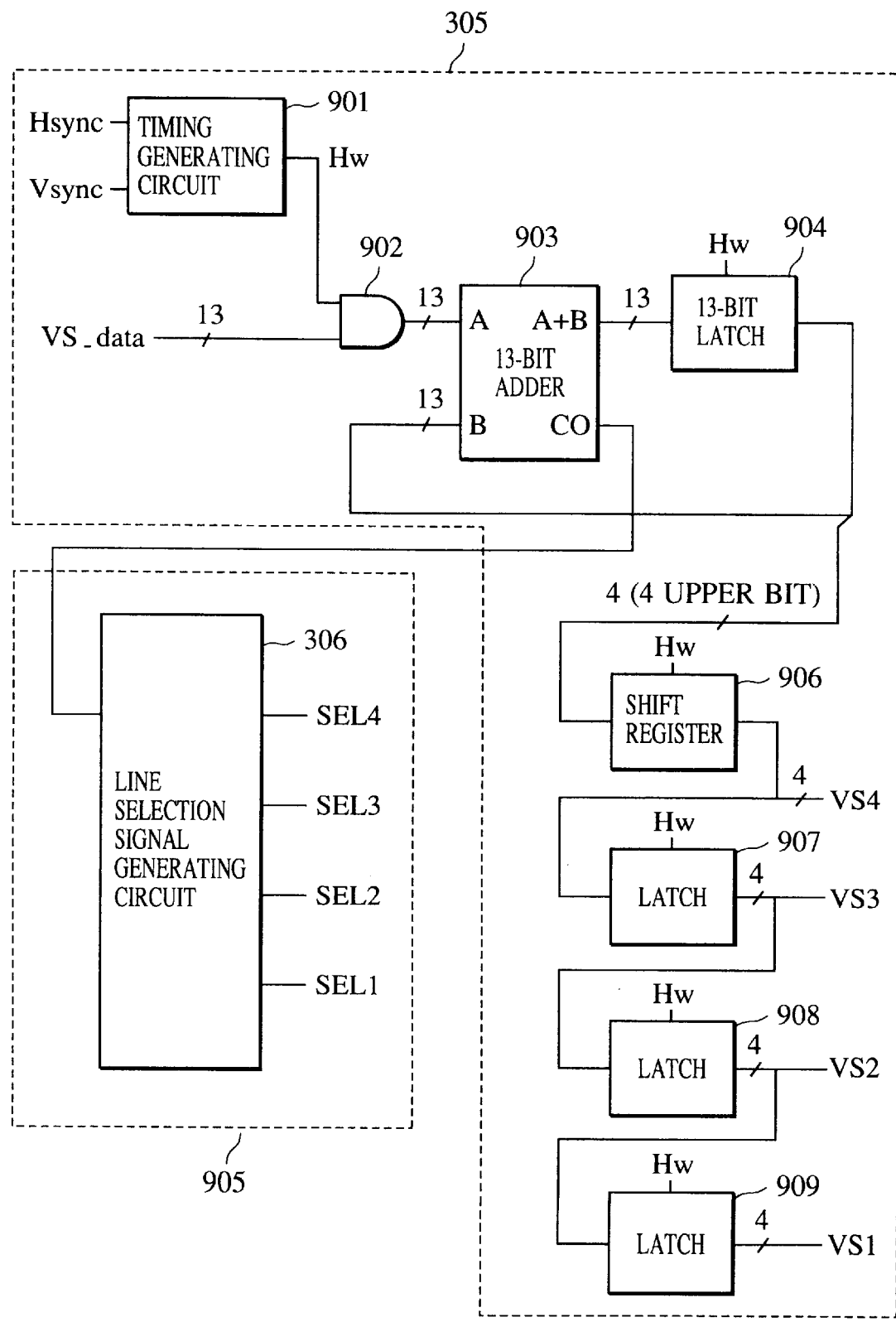
FIG. 9 is a block diagram of the sub-scanning direction magnification calculating circuit 305 and the line selection generating circuit 306 of FIG. 5.

FIG. 9 is a block diagram showing the magnification calculating circuit 305 in the sub-scanning direction and the line selection signal generating circuit 306 (FIG. 5). Reference numeral 901 represents a timing generating circuit for generating timing (signal Hw) for performing actual magnification calculation in response to a horizontal synchronizing signal (hereinafter abbreviated as "Hsync") and a vertical synchronizing signal (Vsync). Symbol VS_data represents magnification data in the form of 13 bits and supplied in accordance with a magnification set by an operator with an operation controller. Reference numeral 902 represents an AND GATE for gating VS_data with Hw. Reference numeral 903 represents a 13-bit adder, and 904 represents a 13-bit latch. Reference numeral 905 represents the line selection signal generating circuit 306 for generating the foregoing selection signals SEL1 to SEL4, the details of the line selection signal generating circuit being described later. Reference numeral 906 represents a shift register for only the four upper bits in the output from the 13-bit latch 904, the shift register 906 having a width of 4 bits and a length of 4 bits. The output from the shift register 906 is VS4 which is used to perform interpolation calculations in the sub-scanning direction. Reference numerals 907, 908 and 909 represent latches each having a width of 4 bits and arranged to transmit outputs which are VS3, VS2 and VS1 which are used to perform interpolation calculations. The latches 904, 906, 907, 908 and 909 are enabled to latch data when Hw=high.

Figures 10, 10A:
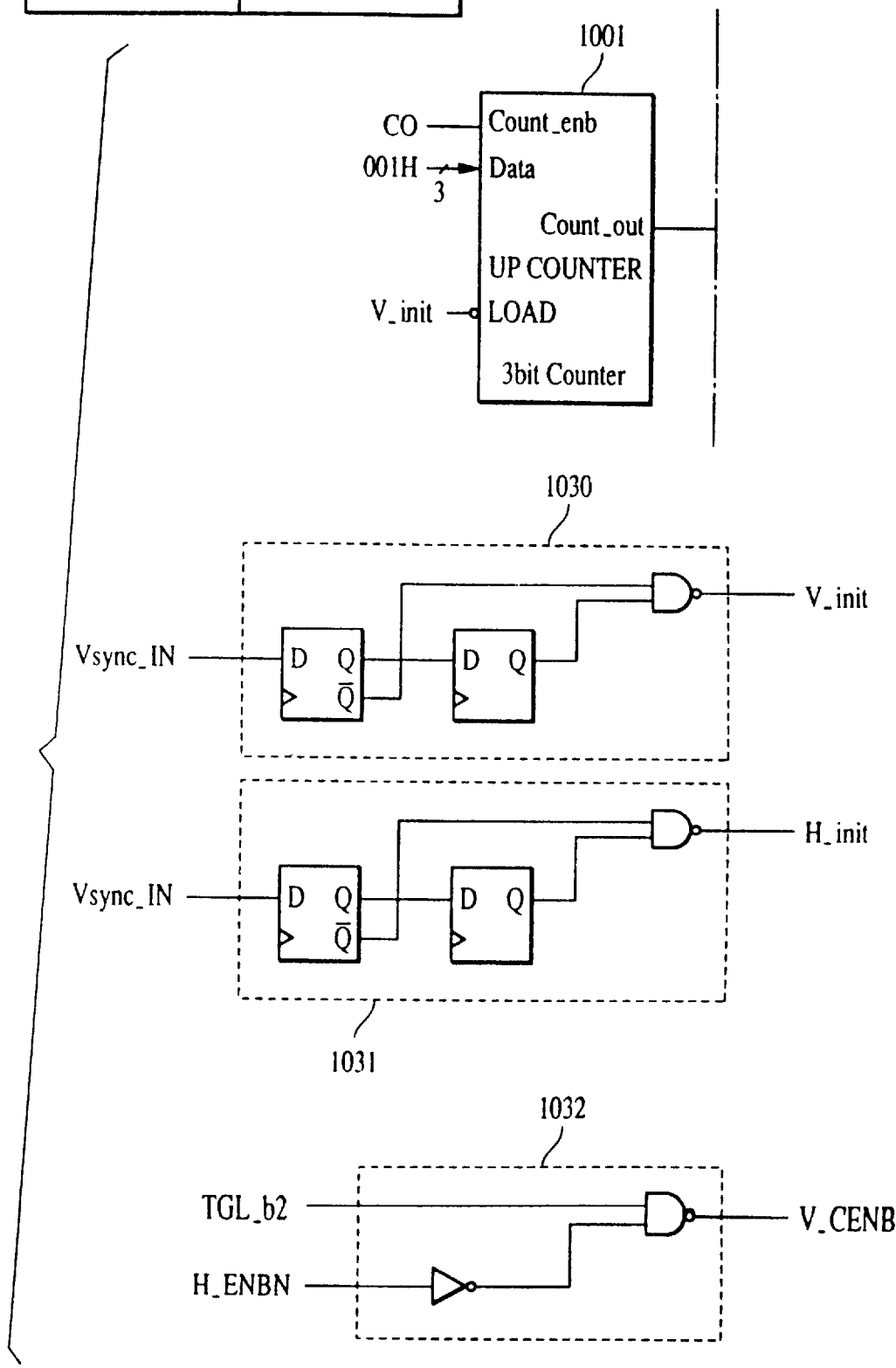
FIGS. 10A, 10B and 11 are block diagrams of a line selection signal generating circuit 306 of FIG. 5.
Figure 10B:
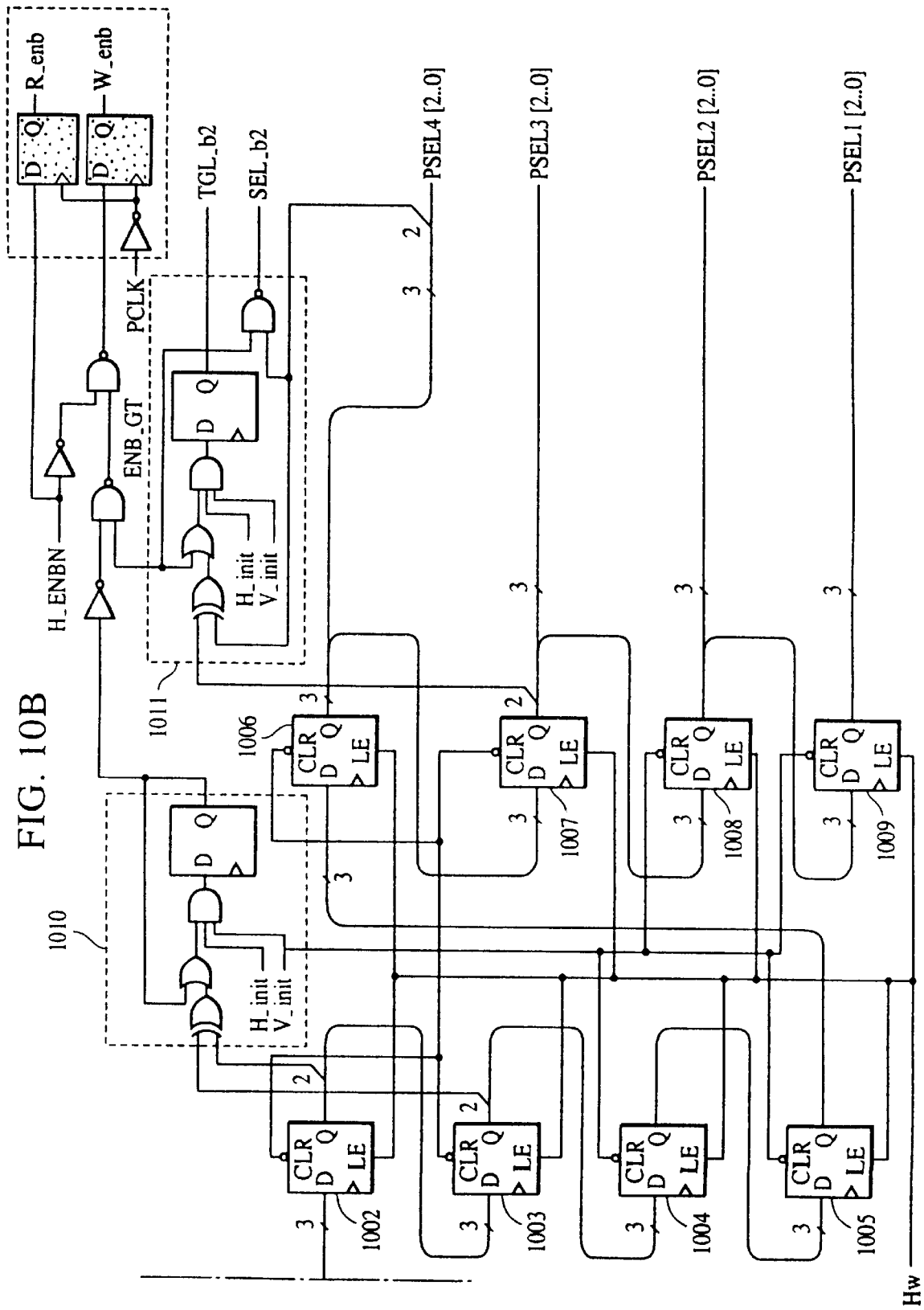
Figure 11:
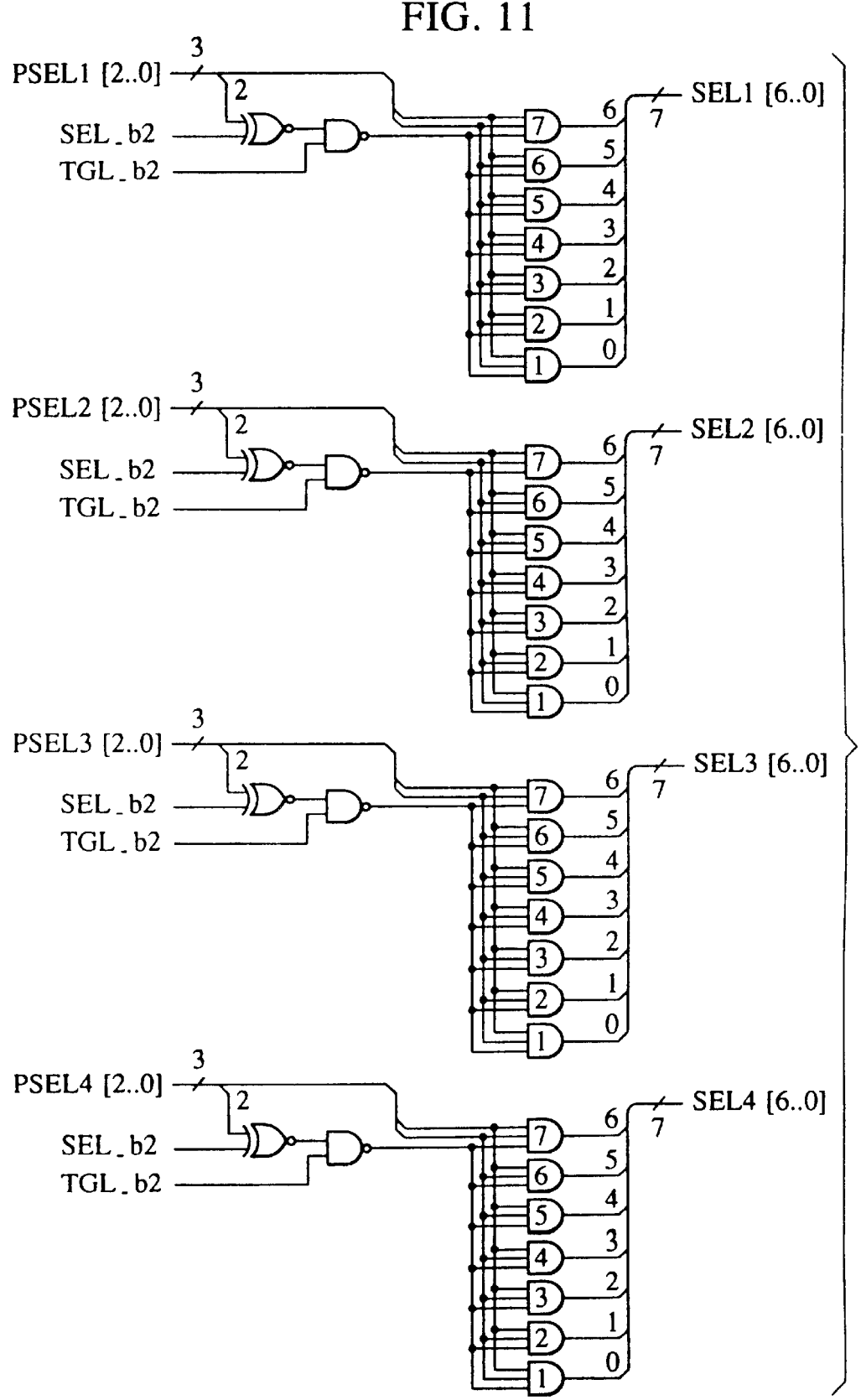

FIGS. 10 and 11 are block diagrams of the line selection signal generating circuit 306 (FIG. 5).

Referring to FIG. 10, reference numeral 1001 represents a 3-bit up-counter which is enabled to count in response to a carry output of the 13-bit adder 903. When signal V_init which is a trailing edge detection signal of a vertical synchronizing signal (hereinafter abbreviated as "Vsync") which is detected by an edge detection circuit 1030 is low, an initial value 1 is loaded to the up-counter 1001.

Reference numerals 1002, 1003, 1004, 1005, 1006, 1007, 1008 and 1009 represent latches forming a shift register having a width of 3 bits. Symbol LE represents a latch enable with which the latch operation is performed when Hw, which is the output of the timing generating circuit 901, is high. The latches 1006, 1007, 1008 and 1009 transmit selection control signals PSEL4 to PSEL1. Reference numerals 1010 and 1011 represent inversion detection circuits for detecting inversion of a bit 2 in the 3-bit output from the latches 1002 and 1006. Reference numeral 1012 represents a circuit for generating a writing signal (W_enb) and reading signal (R_enb) for the FIFO 301. Reference numeral 1031 represents an edge detection circuit which detects the trailing edge of the horizontal synchronizing signal (hereinafter abbreviated as "Hsync") to transmit an edge detection signal H_init. Reference numeral 1032 represents a gate circuit for gating TGL_b2 which is the output from the inversion detection circuit 1011 with H_ENBN.

FIG. 11 is a circuit for generating selection signals SEL1 to SEL4 which are supplied to the line selection circuit 302 in response to the signals shown in FIG. 10. The circuit shown in FIG. 11 receives outputs PSEL1, PSEL2, PSEL3, and PSEL4 from the shift registers (consisting of the latches 1002 to 1009) and outputs SEL_b2 and TGL_b2 from the inversion detection circuit 1011 shown in FIG. 10. The foregoing inputs are supplied to a decoding circuit formed by logic devices arranged as shown in FIG. 11. The decoding circuit transmits SEL1, SEL2, SEL3 and SEL4 in accordance with the logic shown in Tables 5 to 8 which follow, the outputs being connected to the line selection circuit 302 shown in FIG. 5.

The operation of the elements shown in FIGS. 8, 9, 10 and 11 will now be described with reference to a timing chart shown in FIG. 12.

Symbol PCLK represents a system clock having one pixel rate of image data, Vsync represents a synchronizing signal in page units, signal V_init is generated when the edge detection circuit 1030 has detected the trailing edge of Vsync. Similarly, signal H_init is generated when the edge detection circuit 1031 has detected the trailing edge of Hsync. The signals V_init and H_init are normal by high signals.

Signal Hw is generated by the timing generating circuit 901 from signals V_init and H_init, the signal Hw being a normal by low signal having a width of 4 clocks.

Data VS_data has a width of 13 bits as described above and corresponds to the magnification in accordance with the following equation:

$$(8192/(VS\_data))*100=magnification(\%)$$

Figure 12:
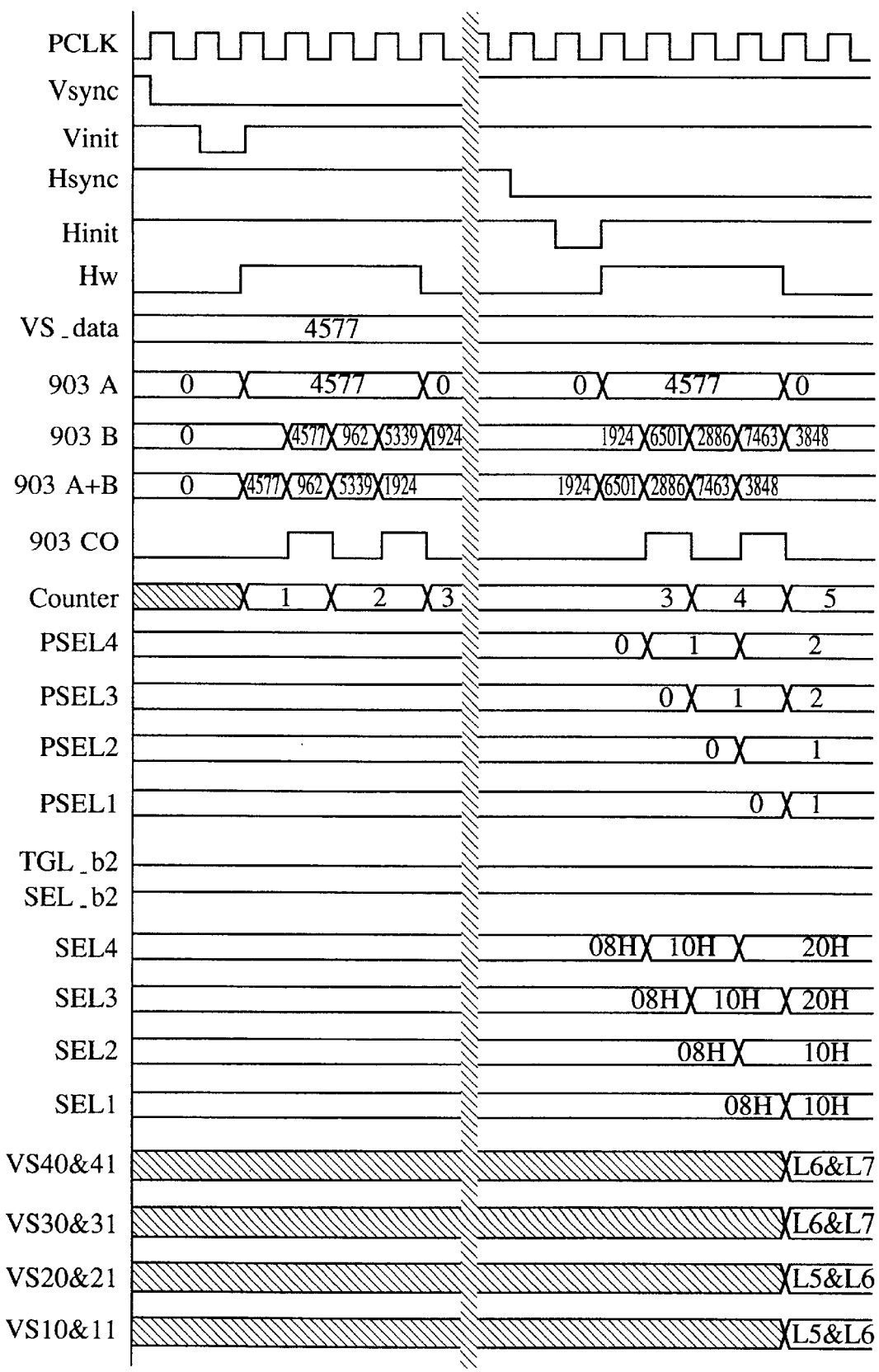
FIG. 12 is a timing diagram of an operation for changing the magnification by 179% in the magnification changing circuit of FIG. 5.

Therefore, when VS_data=4577 as shown in FIG. 12, the magnification is 179%.

Since input A of the 13-bit adder 903 is, in the AND gate 902, gated with the signal Hw supplied from the timing generating circuit 901, it is made to be 4577 in a period of four clocks. Input B of the 13-bit adder 903 is the output of the latch 904, input B having an initial value which is zero because it has been cleared (not shown). Output A+B of the 13-bit adder 903 is latched by the 13-bit latch 904 in a period in which the signal Hw is high. Therefore, the 13 lower bits of a value obtained by cumulatively increasing the initial value (0) with 4577 four times. In a period in which the signal Hw is high, the level of the carry output (hereinafter abbreviated as "CO") of the 13-bit adder 903 is raised twice in two clock periods. Since CO enables the up-counter 1001, the counter 1001 having the initial value of 1 increases the count to a value 3.

The output from the line selection signal generating circuit 306 will now be described with reference to FIG. 10. An initial value 1 is loaded on the counter 1001 when V_init=low. When CO=high, the counter 1001 performs the count increasing operation. Therefore, since it increases the count two times in the first period in which Hw=high, the output from the counter 1001 is 3. Similarly, the counter

1001 increases the count two times in the next period in which Hw=high. Therefore, the counter 1001 transmits an output 5.

Since the latches 1002 to 1009 perform the latching operation in only the period in which Hw=high, selection control signals PSEL1, PSEL2, PSEL3 and PSEL4 respectively are made to be 1, 1, 2 and 2 after two trailing edges of the signal Hw. Output TGL_b2 from the inversion detection circuit 1011 is low and SEL-b2 is high in the foregoing period.

When signals PSEL1, PSEL2, PSEL3 and PSEL4 and signals TGL_b2 and SEL-b2 are decoded by the circuit shown in FIG. 11, the line selection signals of the signals SEL1, SEL2, SEL3 and SEL4 are made to be 10H, 10H, 20H and 20H, the line selection signals each having a width of 7 bits. At this time, the line selection circuit 302 shown in FIG. 8 selects L5 and L6 as VS10 and VS11. Similarly, L5 and L6 are selected as VS20 and VS21, L6 and L7 are selected as VS30 and VS31 and L6 and L7 are selected as VS40 and VS41.

As described above, four sets of two continuous lines are selected and supplied to the four sets of the sub-scanning interpolation circuits 303 shown in FIG. 5. Each of the four sets of the sub-scanning interpolation circuits 303 interpolates the supplied two lines in such a manner that lines in the sub-scanning direction are interpolated.

Figure 13:
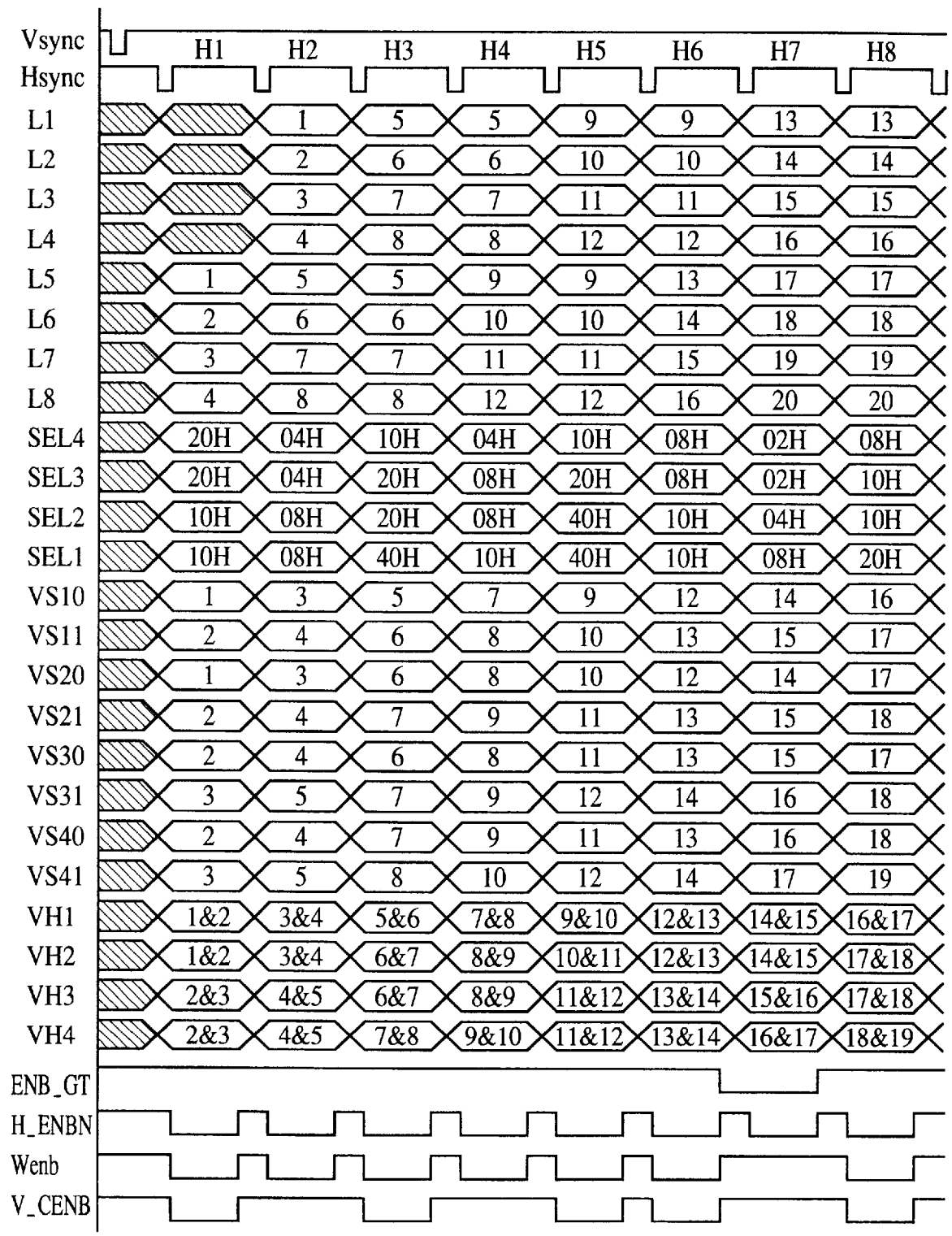
FIG. 13 is another timing diagram of an operation for changing the magnification by 179%.

FIG. 13 is a timing chart when magnification is enlarged by 179%. When the magnification is enlarged by 179%, the number of image lines is multiplied by 1.79 by interpolating two adjacent image lines. The operation of the pixel rate near the trailing edge of the signal Hsync is similar to that shown in the timing chart shown in FIG. 12. When the level of the carry output CO from the 13-bit adder 903 has been raised, the 3-bit counter 1001 performs the count increasing operation. The output from the 3-bit counter 1001 is, through the latches 1002 to 1009 of the shift register, made to be signals PSEL1, PSEL2, PSEL3 and PSEL4, which are, together with outputs TGL_b2 and SEL_b2 which are outputs from the inversion detection output circuit 1011, supplied to a decoding portion of the line selection signal generating circuit 306 shown in FIG. 11 so that four line selection signals SEL4, SEL3, SEL2 and SEL1 are generated. The signals SEL4, SEL3, SEL2 and SEL1 calculated in each of the main scanning periods (H1 to H8) are as shown in FIG. 13.

Data of L5, L6, L7 and L8, to be supplied to the magnification changing circuit 104 through the parallel line conversion circuit 103, is switched in response to a count-up enable signal V_CENB of the sub-scanning counter transmitted from the magnification changing circuit 104 to the page memory controller 101.

The signal V_CENB is a signal obtained by gating the signal TCL_B2 with H_ENBN in the foregoing gate circuit 1032 (see FIG. 10). When the level of the signal V_CENB is low, image data for four parallel lines in the next main scanning period is received by the magnification changing circuit 104 through the page memory 102 and the parallel line conversion circuit 103.

When the level of the signal V_CENB is high, the same image data as that in the previous period is received by the magnification changing circuit 104 in the next main scanning period. When attention is paid to period H7, data of the lines 13, 14, 15 and 16 in the previous period H6 is supplied as the input of data of the lines L1, L2, L3 and L4 through the FIFO 301. Moreover, data of the lines 17, 18, 19 and 20 is supplied as the direct input of data of the lines L5, L6, L7 and L8. At this time, since data of the lines 13, 14, 15 and 16 are considered to be required in the next period H8, the writing operation with respect to the FIFO 301 is inhibited. Data in the next period is, in the period H8, determined by the inversion detection output circuits 1010 and 1011 shown in FIG. 10. When the output of D-F/F of the inversion detection output circuit 1010 is low (no inversion) and output of D-F/F of the inversion detection output circuit 1011 is high (inversion takes place), then ENB_GT=low, as shown in FIG. 13. When Wenb=high, writing of data on the FIFO 301 is, in the foregoing period, inhibited as described above. If writing of data on the FIFO 301 is not inhibited in the period H7, data of the lines 17, 18, 19 and 20 is unintentionally written to the FIFO 301. In the foregoing case, although data of the line 16 is intended to be selected as VS10 in the period H8, data of the foregoing line is not left in the FIFO 301. Therefore, the line interpolation cannot be performed.

However, inhibition of writing of data to the FIFO 301 enables data L1, L2, L3 and L4 through the FIFO 301 to be data of lines 13, 14, 15 and 16 in the next period H8, similar to that in the previous period. Thus, data of each of the lines 16 and 17 is selected as VS10 and V11 so that a desired interpolation corresponding to the rate of change in the magnification is performed.

As described above, the appropriate two lines are selected from 8 continuous lines to perform interpolation in accordance with the rate of change in the magnification so that interpolation in the sub-scanning direction is enabled even in a parallel four-line process. By controlling writing of data on the FIFO in front of the line selection circuit in accordance with the rate of change in the magnification, appropriate two lines are selected from 8 continues lines so that line interpolation of a parallel 4-line circuit is enabled.

TABLE 1

| SEL1 [6 . . . 0] | VS10 | VS11 |
|---|---|---|
| 0000001 | L1 | L2 |
| 0000010 | L2 | L3 |
| 0000100 | L3 | L4 |
| 0001000 | L4 | L5 |
| 0010000 | L5 | L6 |
| 0100000 | L6 | L7 |
| 1000000 | L7 | L8 |

TABLE 2

| SEL2 [6 . . . 0] | VS20 | VS21 |
|---|---|---|
| 0000001 | L1 | L2 |
| 0000010 | L2 | L3 |
| 0000100 | L3 | L4 |
| 0001000 | L4 | L5 |
| 0010000 | L5 | L6 |
| 0100000 | L6 | L7 |
| 1000000 | L7 | L8 |

TABLE 3

| SEL3 [6 . . . 0] | VS30 | VS31 |
|---|---|---|
| 0000001 | L1 | L2 |
| 0000010 | L2 | L3 |
| 0000100 | L3 | L4 |
| 0001000 | L4 | L5 |
| 0010000 | L5 | L6 |
| 0100000 | L6 | L7 |
| 1000000 | L7 | L8 |

TABLE 4

| SEL4 [6 . . . 0] | VS40 | VS41 |
| --- | --- | --- |
| 0000001 | L1 | L2 |
| 0000010 | L2 | L3 |
| 0000100 | L3 | L4 |
| 0001000 | L4 | L5 |
| 0010000 | L5 | L6 |
| 0100000 | L6 | L7 |
| 1000000 | L7 | L8 |

TABLE 5

| PSEL1 [2 . . . 0] | SEL_b2 | TGL_b2 | SEL1 [6 . . . 0] |
| --- | --- | --- | --- |
| 000 | 1 | 0 | 0001000 |
| 001 | 1 | 0 | 0010000 |
| 010 | 1 | 0 | 0100000 |
| 011 | 1 | 0 | 1000000 |
| 100 | 1 | 0 | 0001000 |
| 101 | 1 | 0 | 0010000 |
| 110 | 1 | 0 | 0100000 |
| 111 | 1 | 0 | 1000000 |
| 000 | 0 | 1 | 0000000 |
| 001 | 0 | 1 | 0000001 |
| 010 | 0 | 1 | 0000010 |
| 011 | 0 | 1 | 0000100 |
| 100 | 0 | 1 | 000000 |
| 101 | 0 | 1 | 0010000 |
| 110 | 0 | 1 | 0100000 |
| 111 | 0 | 1 | 1000000 |
| 000 | 1 | 1 | 0000000 |
| 001 | 1 | 1 | 0000001 |
| 010 | 1 | 1 | 0000010 |
| 011 | 1 | 1 | 0000100 |
| 100 | 1 | 1 | 0001000 |
| 101 | 1 | 1 | 0010000 |
| 110 | 1 | 1 | 0100000 |
| 111 | 1 | 1 | 1000000 |

TABLE 6

| PSEL2 [2 . . . 0] | SEL_b2 | TGL_b2 | SEL2 [6 . . . 0] |
| --- | --- | --- | --- |
| 000 | 1 | 0 | 0001000 |
| 001 | 1 | 0 | 0010000 |
| 010 | 1 | 0 | 0100000 |
| 011 | 1 | 0 | 1000000 |
| 100 | 1 | 0 | 0001000 |
| 101 | 1 | 0 | 0010000 |
| 110 | 1 | 0 | 0100000 |
| 111 | 1 | 0 | 1000000 |
| 000 | 0 | 1 | 0000000 |
| 001 | 0 | 1 | 0000001 |
| 010 | 0 | 1 | 0000010 |
| 011 | 0 | 1 | 0000100 |
| 100 | 0 | 1 | 0001000 |
| 101 | 0 | 1 | 0010000 |
| 110 | 0 | 1 | 0100000 |
| 111 | 0 | 1 | 1000000 |
| 000 | 1 | 1 | 0000000 |
| 001 | 1 | 1 | 0000001 |
| 010 | 1 | 1 | 0000010 |
| 011 | 1 | 1 | 0000100 |
| 100 | 1 | 1 | 0001000 |
| 101 | 1 | 1 | 0010000 |
| 110 | 1 | 1 | 0100000 |
| 111 | 1 | 1 | 1000000 |

TABLE 7

| PSEL3 [2 . . . 0] | SEL_b2 | TGL_b2 | SEL3 [6 . . . 0] |
| --- | --- | --- | --- |
| 000 | 1 | 0 | 0001000 |
| 001 | 1 | 0 | 0010000 |
| 010 | 1 | 0 | 0100000 |
| 011 | 1 | 0 | 1000000 |
| 100 | 1 | 0 | 0001000 |
| 101 | 1 | 0 | 0010000 |
| 110 | 1 | 0 | 0100000 |
| 111 | 1 | 0 | 1000000 |
| 000 | 0 | 1 | 0000000 |
| 001 | 0 | 1 | 0000001 |
| 010 | 0 | 1 | 0000010 |
| 011 | 0 | 1 | 0000100 |
| 100 | 0 | 1 | 0001000 |
| 101 | 0 | 1 | 0010000 |
| 110 | 0 | 1 | 0100000 |
| 111 | 0 | 1 | 1000000 |
| 000 | 1 | 1 | 0000000 |
| 001 | 1 | 1 | 0000001 |
| 010 | 1 | 1 | 0000010 |
| 011 | 1 | 1 | 0000100 |
| 100 | 1 | 1 | 0001000 |
| 101 | 1 | 1 | 0010000 |
| 110 | 1 | 1 | 0100000 |
| 111 | 1 | 1 | 1000000 |

TABLE 8

| PSEL4 [2 . . . 0] | SEL_b2 | TGL_b2 | SEL4 [6 . . . 0] |
| --- | --- | --- | --- |
| 000 | 1 | 0 | 0001000 |
| 001 | 1 | 0 | 0010000 |
| 010 | 1 | 0 | 0100000 |
| 011 | 1 | 0 | 1000000 |
| 100 | 1 | 0 | 0001000 |
| 101 | 1 | 0 | 0010000 |
| 110 | 1 | 0 | 0100000 |
| 111 | 1 | 0 | 1000000 |
| 000 | 0 | 1 | 0000000 |
| 001 | 0 | 1 | 0000001 |
| 010 | 0 | 1 | 0000010 |
| 011 | 0 | 1 | 0000100 |
| 100 | 0 | 1 | 0001000 |
| 101 | 0 | 1 | 0010000 |
| 110 | 0 | 1 | 0100000 |
| 111 | 0 | 1 | 1000000 |
| 000 | 1 | 1 | 0000000 |
| 001 | 1 | 1 | 0000001 |
| 010 | 1 | 1 | 0000010 |
| 011 | 1 | 1 | 0000100 |
| 100 | 1 | 1 | 0001000 |
| 101 | 1 | 1 | 0010000 |
| 110 | 1 | 1 | 0100000 |
| 111 | 1 | 1 | 1000000 |

As described above, image data for a plurality of lines, which is supplied in parallel, can efficiently and quickly be subjected to an image process, such as an interpolation process, corresponding to the rate of change in the magnification.

Although the invention has been described in its preferred form with a certain degree of particularity, it is understood that the present embodiments of the preferred form can be changed in the details of construction and in the combination and arrangement of parts without departing from the spirit and the scope of the invention as hereinafter claimed.

What is claimed is:

1. An image data processing apparatus comprising:
   input means for serially inputting image data for a plurality of consecutive lines;
   conversion means for performing a parallel conversion on the input image data and outputting the image data for a plurality of consecutive lines in parallel;

selection means for selecting a plurality of sets of image data, each of which consists of image data for at least one line, from the image data for a plurality of lines output in parallel by said conversion means; and processing means for performing an image-processing on each of the plurality of sets of image data selected by said selection means and for outputting processed image data for a plurality of consecutive lines in parallel.

2. An image data processing apparatus according to claim 1, wherein said selection means selects the plurality of sets of image data, each of which consists of image data for two adjacent lines.

3. An image data processing apparatus according to claim 2, wherein said processing means performs an interpolation process on the image data for two adjacent lines included in each of the plurality of sets of image data.

4. An image data processing apparatus according to claim 3, wherein said processing means comprises a plurality of interpolation process means, each of which performs an interpolation process on the image data for two adjacent lines included in each of the plurality of sets of image data.

5. An image data processing apparatus according to claim 1, wherein said selection means changes image data to be included in each of the plurality of sets of image data in accordance with a magnification/reduction rate of an image.

6. An image data processing apparatus according to claim 1, wherein said selection means comprises storage means for storing the image data for a plurality of consecutive lines output in parallel by said conversion means, wherein said selection means selects the plurality of sets of image data from the image data for a plurality of lines output by said conversion means and the image data for a plurality of lines read from said storage means.

7. An image data processing apparatus according to claim 6, wherein writing of image data for a plurality of consecutive lines in said storage means is controlled in accordance with a magnification/reduction rate of an image.

8. An image data processing method comprising:

an inputting step of serially inputting image data for a plurality of consecutive lines;

a conversion step of performing a parallel conversion on the input image data so as to output the image data for a plurality of consecutive lines in parallel;

a selection step of selecting a plurality of sets of image data, each of which consists of image data for at least one line, from the image data for a plurality of lines output in parallel at said conversion step; and a processing step of performing an image-processing on each of the plurality of sets of image data selected at said selection step so as to output processed image data for a plurality of consecutive line in parallel.

9. An image data processing method according to claim 8, wherein the plurality of sets of image data, each of which consists of image data for two adjacent lines, are selected at said selection step.

10. An image data processing method according to claim 9, wherein an interpolation process is performed on the image data for two adjacent lines included in each of the plurality of sets of image data at said processing step.

11. An image data processing method according to claim 8, wherein image data is selected to be included in each of the plurality of sets of image data in accordance with a magnification/reduction rate of an image at said selection step.

12. An image data processing apparatus comprising:

an image memory which serially inputs image data for a plurality of consecutive lines;

a line parallel conversion circuit which performs a parallel conversion on the input image data so as to output image data for a plurality of consecutive lines in parallel;

a line selection circuit which selects a plurality of sets of image data, each of which consists of image data for at least one line, from the image data for a plurality of lines output in parallel from said line parallel conversion circuit; and an interpolation circuit which performs an interpolation process on each of the plurality of sets of image data output from said line selection circuit so as to output interpolation processed image data for a plurality of consecutive lines in parallel.

13. An image data processing apparatus according to claim 12, wherein said line selection circuit selects the plurality of sets of image data, each of which consists of image data for two adjacent lines.

14. An image data processing apparatus according to claim 13, wherein said interpolation circuit performs an interpolation process on the image data for two adjacent lines included in each of the plurality of sets of image data.

15. An image data processing apparatus according to claim 14, wherein said interpolation circuit comprises a plurality of sub-scanning interpolation circuits, each of which performs an interpolation process on the image data for two adjacent lines included in each of the plurality of sets of image data.

16. An image data processing apparatus according to claim 12, wherein said line selection circuit changes image data to be included in each of the plurality of sets of image data in accordance with a magnification/reduction rate of an image.

17. An image data processing apparatus according to claim 12, wherein said line selection circuit comprises a FIFO memory which stores the image data for a plurality of consecutive lines output in parallel from said line conversion circuit, wherein said line selection circuit selects the plurality of sets of image data from the image data for a plurality of lines output from said line conversion circuit and the image data for a plurality of lines read from said FIFO memory.

18. An image data processing apparatus according to claim 17, wherein writing of image data for a plurality of consecutive lines in said FIFO memory is controlled in accordance with a magnification/reduction rate of an image.

* * * * *

UNITED STATES PATENT AND TRADEMARK OFFICE
CERTIFICATE OF CORRECTION

PATENT NO. : 5,774,234

DATED : June 30, 1998

INVENTOR(S) : RYOSUKE MIYAMOTO ET AL.

It is certified that error appears in the above-identified patent and that said Letters Patent is hereby corrected as shown below:

COLUMN 3 line 13,   "line" should read --lines--; and
   line 14,   "speed" (first occurrence) should read --speed of--.

COLUMN 4 line 60,   "is" should be deleted.

COLUMN 8 line 31,   "continues" should read --continuous--.

COLUMN 9 line 30,   "100   0   1   000000" should read
   (TBL 5)   --100   0   1   0001000--.

Signed and Sealed this

Fourth Day of May, 1999

Attest:

Q. TODD DICKINSON

*Attesting Officer*     *Acting Commissioner of Patents and Trademarks*